United States Patent [19]

Numata et al.

[11] 4,096,496
[45] Jun. 20, 1978

[54] EXPOSURE CONTROL CIRCUIT FOR CAMERA

[75] Inventors: Saburo Numata; Shinichiro Okazaki, both of Urawa, Japan

[73] Assignee: Fuji Photo Optical Co., Ltd., Omiya, Japan

[21] Appl. No.: 800,067

[22] Filed: May 24, 1977

[30] Foreign Application Priority Data

May 26, 1976 Japan .................................. 51-60823

[51] Int. Cl.² .............................................. G03B 7/00
[52] U.S. Cl. ................................ 354/60 A; 354/23 D; 331/116 R
[58] Field of Search ............. 354/60 A, 23 D; 331/73, 331/116 R, 175, 176

[56] References Cited

U.S. PATENT DOCUMENTS

| 3,725,822 | 4/1973 | Eaton, Jr. .............................. 331/175 |
| 3,935,546 | 1/1976 | Morozumi et al. .................. 331/175 |
| 3,979,698 | 9/1976 | Gollinger ......................... 331/116 R |
| 4,013,979 | 3/1977 | Vittoz ............................... 331/116 R |

Primary Examiner—Russell E. Adams
Attorney, Agent, or Firm—Harold L. Stults

[57] ABSTRACT

In an exposure control circuit for a camera including a digital control circuit, a crystal oscillator is used as a pulse generator. Between the crystal oscillator and the power source is connected a small current supply circuit for constantly supplying a small current to the crystal oscillator for constantly maintaining the oscillator in a stable condition.

9 Claims, 1 Drawing Figure

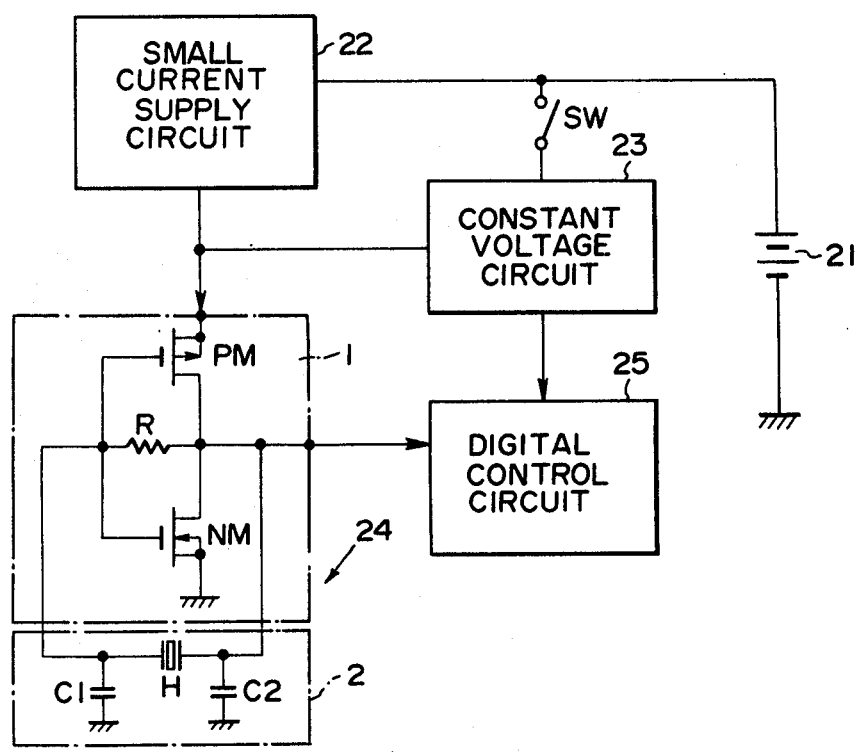

EXPOSURE CONTROL CIRCUIT FOR CAMERA

BACKGROUND OF THE INVENTION

1. Field of the Invention

This invention relates to an exposure control circuit for a camera, and more particularly to an exposure control circuit for a camera including a crystal oscillator.

2. Description of the Prior Art

It is known that a crystal oscillator has a very unstable starting characteristic but has a good stability after several minutes have lapsed since the start of power supply. Therefore, the crystal oscillator is used in a circuit which is normally energized such as a circuit in a watch.

If the crystal oscillator is used in an exposure control circuit of a camera, it becomes necessary to normally supply current to the circuit. Since the driving voltage of the crystal oscillator is desired to be 3 to 6V in an exposure control circuit including a light measuring circuit, an A-D converter and a digital control circuit, the current to be supplied to the crystal oscillator will be several milliampares. This will require a power source of large capacity, which is unfavorable in the photographic camera that is usually preferred to be as small as possible in size. If the power is supplied only when the pictures are taken, it will practically be impossible to take snaps at any time as desired.

Therefore, it has been considered impossible or very hard to use a crystal oscillator in a photographic camera. On the other hand, however, it is desirable that the high stability of the crystal oscillator be made use of in cameras in order to obtain a highly stable exposure control.

SUMMARY OF THE INVENTION

It is therefore the primary object of the present invention to provide an exposure control circuit for a camera in which a crystal oscillator is used.

It is a specific object of the present invention to provide an exposure control circuit for a camera in which a crystal oscillator is used without consuming the electric power to a great extent.

Another object of the present invention is to provide an exposure control circuit for a camera in which a crystal oscillator is used in such a condition that the exposure control circuit is not subjected to the unstable starting characteristic of the crystal oscillator.

The above objects are accomplished by supplying very small current to the crystal oscillator to maintain the same in the stable state constantly. Since the crystal oscillator is constantly supplied with a current, the characteristic thereof is constantly maintained stable. Further, since only a very small current is constantly supplied to the crystal oscillator, the power consumption thereby is very small.

BRIEF DESCRIPTION OF THE DRAWING

A single FIGURE is a diagram which shows an embodiment of the exposure control circuit for a camera including a crystal oscillator in accordance with the present invention.

DESCRIPTION OF THE PREFERRED EMBODIMENT

Referring to the drawing, a power source 21 is connected with a small current supply circuit 22 which is connected with an input of a crystal oscillator 24. The crystal oscillator 24 is connected by way of its output with a digital control circuit 25. Between the digital control circuit 25 and the power source 21 is connected a constant voltage circuit 23. A switch SW which is closed upon the first stage of depression of a shutter release button is connected between the power source 21 and the constant voltage circuit 23. The constant voltage circuit 23 is further connected with a connecting point between the small current supply circuit 22 and the crystal oscillator 24.

The small current supply circuit 22 may be a constant-current circuit using a constant-current diode or a field effect transistor, a series of diodes or a high resistor. Any element which is capable of supplying a small current to the crystal oscillator 24 can be used as the small current supply circuit 22.

The digital control circuit 25 is an exposure control circuit built in a camera for controlling the exposure time or aperture size of the diaphragm in the camera including a light measuring circuit, an A-D converter, an arithmetic circuit, a logic circuit and a light emitting element driving circuit, for instance. Any kind of digital control circuit may be connected here. Since this circuit is not directly related with the subject matter of the present invention, the structure and operation thereof will not be described in detail here.

The crystal oscillator 24 is composed of an inverter 1 and a feedback circuit 2. The inverter 1 is constituted of complementary MOS (metal oxide semiconductor)-type field effect transistors PM and NM. A resistor of 100K ohm to 100M ohm is connected between the transistors PM and NM to make the input voltage between the input and output of the inverter 1. The feedback circuit 2 is comprised of a frequency adjustment capacitor C1, a temperature compensation capacitor C2 and a quartz H. As well known in the art, the signal inverted by the inverter 1 is further inverted by the feedback circuit 2 and a positive feedback of the inverted signal is further made to generate oscillation. The crystal oscillation consumes current of less than about 0.5 microampare when driven by 1.5 V and less than about 1 milliampare when driven by 4.5 V.

In operation of above described embodiment of the invention, when a power source 21 is loaded in the camera a small current of 0.1 to several microampares for example starts to be supplied to the crystal oscillator 24 through the small current supply circuit 22. Since the output supplied thereby is extremely small, there is no problem of power consumption. Then, upon first stage of depression of the shutter release button of the camera, the switch SW is closed to apply a normal voltage to the crystal oscillator 24 by way of the contant-voltage circuit 23. Further, the same voltage is applied to the digital control circuit 25 from the constant voltage circuit 23. The normal voltage applied to the crystal oscillator 24 and the digital control circuit 25 is 4.5 V for instance. When the crystal oscillator 24 is supplied with the normal current in response to closure of the switch SW, the starting characteristic of the crystal oscillator 24 is observed. However, the period of the unstable starting characteristic is not longer than one second, whereas the normal period of the unstable starting characteristic is several as long as several minutes. Thus, the starting characteristics of the crystal oscillator is markedly improved.

We claim:

1. An exposure control circuit for a camera comprising a power source, a crystal oscillator having an input and an output, a small current supply circuit connected between said power source and the input of said crystal oscillator for constantly supplying a small current to the crystal oscillator, a digital control circuit connected with the output of said crystal oscillator for controlling an exposure factor, a normally opened switch connected between the power source and the digital control circuit and also between the power source and the input of the crystal oscillator, said normally open switch being closed upon the first stage of depression of a shutter release button of the camera.

2. An exposure control circuit for a camera as defined in claim 1 wherein a constant voltage circuit is connected between said normally open switch and said digital control circuit.

3. An exposure control circuit for a camera as defined in claim 2 wherein said constant voltage circuit is connected between said normally open switch and said crystal oscillator.

4. An exposure control circuit for a camera as defined in claim 1 wherein a constant voltage circuit is connected between said normally open switch and said crystal oscillator.

5. An exposure control circuit for a camera as defined in claim 1 wherein said small current supply circuit is a constant-current circuit.

6. An exposure control circuit for a camera as defined in claim 5 wherein said constant-current circuit comprises a constant-current diode.

7. An exposure control circuit for a camera as defined in claim 5 wherein said constant-current circuit comprises a field effect transistor.

8. An exposure control circuit for a camera as defined in claim 1 wherein said small current supply circuit is a series of diodes.

9. An exposure control circuit for a camera as defined in claim 1 wherein said small current supply circuit is a high resistor.

* * * * *